United States Patent
Lee

(10) Patent No.: US 8,323,421 B2
(45) Date of Patent: Dec. 4, 2012

(54) AUTOMATIC CLEANING SYSTEM FOR SOLAR PANELS AND METHOD THEREOF

(75) Inventor: Han-Lung Lee, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 867 days.

(21) Appl. No.: 12/333,624

(22) Filed: Dec. 12, 2008

(65) Prior Publication Data

US 2009/0266353 A1  Oct. 29, 2009

(51) Int. Cl.
*B08B 3/02* (2006.01)

(52) U.S. Cl. ............ 134/56 R; 134/113; 134/198

(58) Field of Classification Search .......... 134/56 R, 134/113, 198
See application file for complete search history.

(56) References Cited

U.S. PATENT DOCUMENTS

| | | | | |
|---|---|---|---|---|
| 3,454,976 | A * | 7/1969 | Kijinski | 15/250.01 |
| 3,715,774 | A * | 2/1973 | Fannon, Jr. | 15/302 |
| 4,362,001 | A * | 12/1982 | Cockerham et al. | 53/441 |
| 4,955,291 | A * | 9/1990 | Dillon et al. | 104/299 |
| 5,323,508 | A * | 6/1994 | Sheldrake | 15/250.22 |
| 6,851,156 | B1 * | 2/2005 | Hairaton | 15/250.01 |
| 6,911,593 | B2 * | 6/2005 | Mazumder et al. | 136/251 |
| 7,231,683 | B1 * | 6/2007 | Cruz | 15/103 |
| 7,540,925 | B2 * | 6/2009 | Manor et al. | 134/6 |
| 7,999,173 | B1 * | 8/2011 | Ashpis | 136/251 |
| 2002/0066473 | A1 * | 6/2002 | Levy et al. | 134/34 |
| 2006/0048800 | A1 * | 3/2006 | Rast et al. | 134/56 R |
| 2007/0240278 | A1 * | 10/2007 | MacDonald | 15/405 |

FOREIGN PATENT DOCUMENTS

| | | | |
|---|---|---|---|
| CN | 1970175 | * | 5/2007 |
| CN | 2906528 | * | 5/2007 |
| CN | 201011067 | * | 1/2008 |
| CN | 101161359 | * | 4/2008 |
| DE | 100 28 093 | * | 12/2001 |
| DE | 10 2005 007 200 | * | 8/2006 |
| JP | 57-065540 | * | 4/1982 |
| JP | 59-150484 | A | 8/1984 |
| JP | 60-156224 | * | 8/1985 |
| JP | 11-350684 | * | 12/1999 |
| JP | 2002-348079 | * | 12/2002 |
| JP | 2007-110038 | * | 4/2007 |
| JP | 2007-190305 | * | 8/2007 |

OTHER PUBLICATIONS

WIPO WO 80/02104 Oct. 1980.*
WIPO WO 01/01840 Jan. 2001.*
WIPO WO 2004/091816 Oct. 2004.*

* cited by examiner

*Primary Examiner* — Frankie L Stinson
(74) *Attorney, Agent, or Firm* — Altis Law Group, Inc.

(57) ABSTRACT

An automatic cleaning system for solar panels has a time controller, a detection device, a perfusion device, a driving device and a cleaning device. Based on predetermined time values, execution signals are sent to the perfusion device, the driving device and the detection device to implement prompt assessment of the need for cleaning and cleaning, if warranted. Also provided is an automatic cleaning method using the system.

10 Claims, 6 Drawing Sheets

AUTOMATIC CLEANING SYSTEM FOR SOLAR PANELS AND METHOD THEREOF

TECHNICAL FIELD OF THE INVENTION

The disclosure relates to cleaning systems and, particularly, to a cleaning system and method for automatically cleaning solar panels.

BACKGROUND OF THE INVENTION

Nowadays, with the resources on the earth being depleted day by day, the cost of investment for energy increases significantly. Solar energy has drawn attention from the energy industry as an alternative source of energy, and found widespread applications in a variety of fields.

Solar cells convert photons from solar radiation into electrical energy through semiconductor equipment using solar cells (please refer to "Grown Junction GaAs Solar Cell" by C. C. Shen and G. L. Pearson, Volume 64, Issue 3, Proceedings of the IEEE, pages 384-385, March 1976.) The phototransducing process produces electron-hole pairs when the radiated photons reach a solar panel, combining the photons with atoms and valence electrons in the semiconductor material. Because of the electron-hole pairs, photovoltaic electromotive forces are formed close to the P-N junction, providing electrical power when P section and the N section in the semiconductor material are wired. Connecting the semiconductor materials parallel or in series provides a solar panel that outputs constant voltage and current.

To maximize reception of solar energy, the solar panel is normally in an elevated position and angled. This, combined with exposure to the elements, creates a need for frequent cleaning, especially since even a thin coating of dust or dirt can seriously affect the efficiency of photovoltaic energy production. Cleaning the solar panel is accordingly difficult. Existing cleaning devices for solar panels normally utilize mechanical structure, but still require manual operation. As well, such systems cannot detect contaminant on the surface of the solar panel in a timely manner, nor can they remove the dirt automatically. The cleaning device or system can thus significantly affect performance of the solar panel.

SUMMARY

The disclosure provides an automatic cleaning system for solar panels which comprises a protection panel for protecting the solar panel, a driving device for providing driving force, a cleaning device arranged on the driving device which is driven by the driving device and thereby cleans the solar panel. The automatic cleaning system for solar panel further comprises a detection device that detects the dirt on the solar panel, determines if the solar panel needs to be cleaned, and instructs the driving device clean the solar panel according to the detection result. A method for automatically cleaning the solar panel utilizing the automatic cleaning system is also disclosed, which comprises: providing an automatically cleaning system for a solar panel; obtaining an environmental intensity of sunlight in the outside environment with an environmental light sensor, obtaining a transmitted intensity of incident sunlight throughout the protection panel with a transmission light sensor, and derive a detection difference value between the environmental intensity and the transmitted intensity; comparing the detection difference value with a predetermined value; if the detection difference value is larger than the predetermined value, the solar panel will be cleaned; if the detection difference value is smaller than the predetermined value, the solar panel will not be cleaned; the driving device sends execution signals to a perfusion device and a driving device so as to the driving device drives a cleaning device to clean the solar panel when the solar panel needs to be cleaned.

BRIEF DESCRIPTION FOR THE DRAWINGS

DETAILED DESCRIPTION

Figure 1:
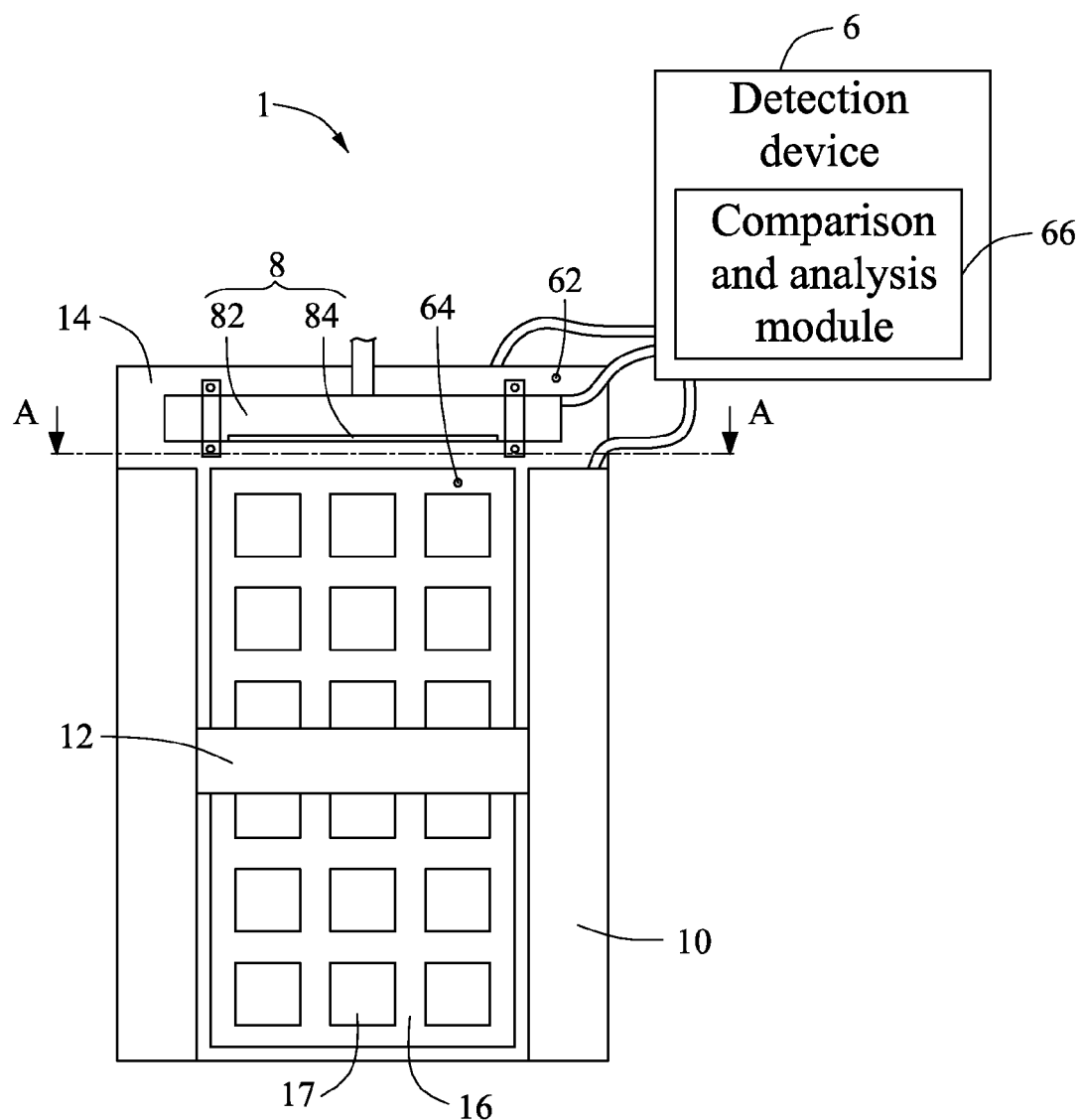
FIG. 1 is a schematic view for a first embodiment of an automatic cleaning system for solar panels.
Figure 2:
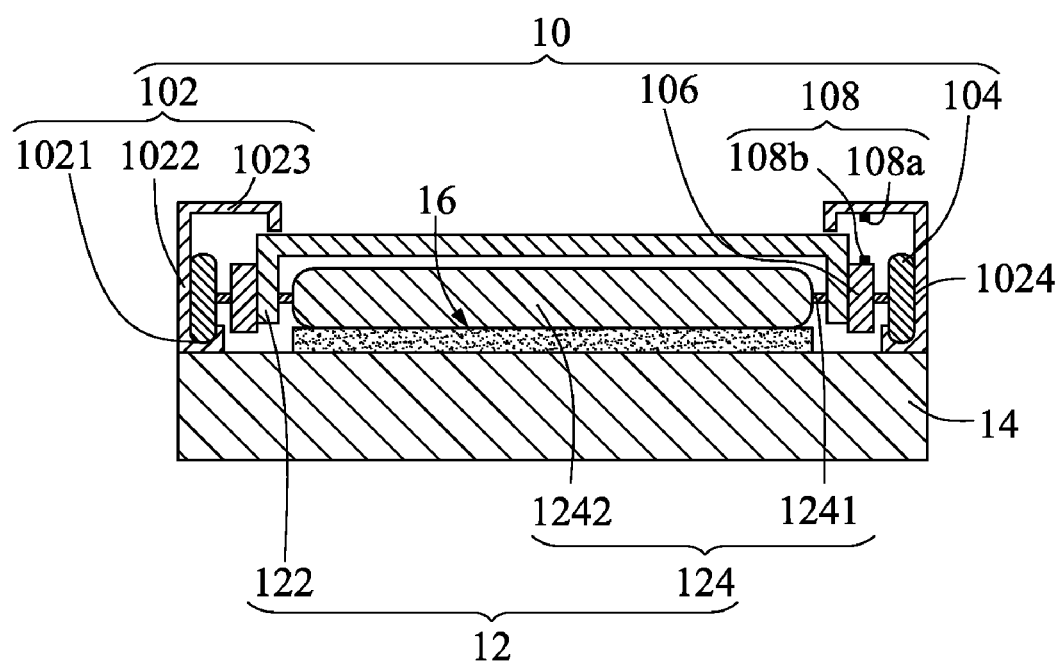
FIG. 2 is a cross-section view taken along the line A-A in FIG. 1.

FIGS. 1 and 2 show an automatic cleaning system 1 for solar panels, which comprises a solar panel 14, a detection device 6, a perfusion device 8, a driving device 10, and a cleaning device 12.

The solar panel 14 comprises a transparent protection panel 16 and a plurality of solar cells 17 covered thereunder. The detection device 6 detects dirt on the protection panel 16 and instructs the perfusion device 8 and the driving device 10 clean the solar panel 14 based on the detection result. The cleaning device 12 is driven by the driving device 10 to clean the solar panel.

The detection device 6 comprises an environmental light sensor 62 external to the protection panel 16, a received light sensor 64 provided under the protection panel 16, and a comparison and analysis module 66. The environmental light sensor 62 directly detects intensity of sunlight incident thereon. The received light sensor 64 detects the intensity of sunlight passed through the protection panel 16.

The comparison and analysis module 66 compares intensity detected by the environmental light sensor 62 with that detected by the received light sensor 64, and determines if the solar cell panel 14 needs to be cleansed. Accumulated dirt and dust on the solar panel will reduce the amount of sunlight passed through the protection panel 16. A difference value Y2 between the sunlight intensity detected by the environmental light sensor 62 and the intensity detected by the transmitted light sensor can be derived. The comparison and analysis module predetermines a standard intensity difference value Y1 based on an ideal condition of the protection panel 16. If the detected intensity difference value Y2 is less than or equals the standard intensity difference value Y1, the protection panel 16 satisfies the predetermined clean standard and does not need to be cleaned. If the detected intensity difference value Y2 exceeds the standard intensity difference value Y1, the protection panel 16 cannot satisfy the predetermined standard, and the comparison and analysis module issues an execution signal to the perfusion device 8 and the driving device 10.

The perfusion device 8 is an auxiliary cleaning device provided on the top of the solar panel 14, which comprises a conduit 82 comprising an outlet tank 84. After receiving the execution signal from the detection device 6, the perfusion device 8 sprays water and cleaning agent to clean the protection panel 16.

The driving device 10 comprises a slide slot 102 provided on both sides of the solar panel 14, a pulley 104 sliding in the slide slot 102, a driving motor 106 moving the pulley 104, and a pair of commutation sensors 108 provided on the motor 106.

Each of the slide slot 102 comprises a pair of slides 1021 connected to the solar panel 14, a sidewall 1022 extending upward along the outer edge of slides 1021, and a baffle 1023 provided on the top of the sidewall 1022 which extends toward the center of the solar panel 14. The slides 1021 are wider than the pulley 104 so as to limit the range of motion thereof. The sidewall 1022 prevents the pulley 104 from diverging outward. The baffle 1023 separates the pulley 104 and the driving motor 106 connected to the pulley 104 to prevent dust and dirt entering the slides 1021. The commutation sensor 108, provided on the inner side of the baffle 1023 toward the slides 1021 and on the motor 106, comprises a primary commutation sensor 108b and two secondary commutation sensors 108a. The primary commutation sensor 108b is provided close to one side of driving motor 106 which is opposite to the baffle 1023, and the secondary commutation sensors 108a are provided on inner sides of the baffle 1023 which correspond to the primary commutation sensor 108b. When the driving motor 106 moves the cleaning device 12 to the two ends of the solar panel 14, the secondary commutation sensor 108a is opposite to the primary commutation sensor 108b, and the driving motor 106 obtains a commutation signal to change the moving direction of the cleaning device 12, so that the cleaning device 12 move to the other end of the solar panel 14.

The cleaning device 12 comprises a holding part 122 connected to the driving device 10 and a washer 124 provided on the holding part 122. The holding part 122 is provided between the pulleys 104, and is moved by the rotation of the pulleys 104. The washer 124 comprises a rolling brush 1242 with a rolling axle 1241, and the rolling axle 1241 is driven by a motor (not shown) provided within the holding part 122.

Figure 3:
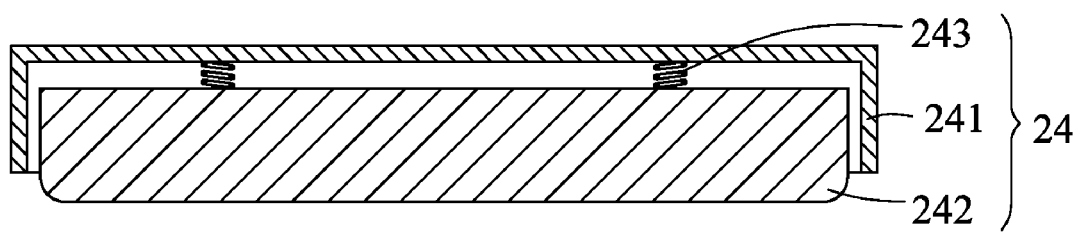
FIG. 3 shows a second embodiment of an automatic cleaning system for solar panels.

FIG. 3 shows a second embodiment of an automatic cleaning system for solar panels including an automatic cleaning device 24, differing from the previous embodiment only in that a washer 242 of cleaning device 24 is not rotatable, and a number of flexible members 243 provided within a holding part 241 impels the washer 242 to contact the solar panel to be cleaned.

Figure 4:
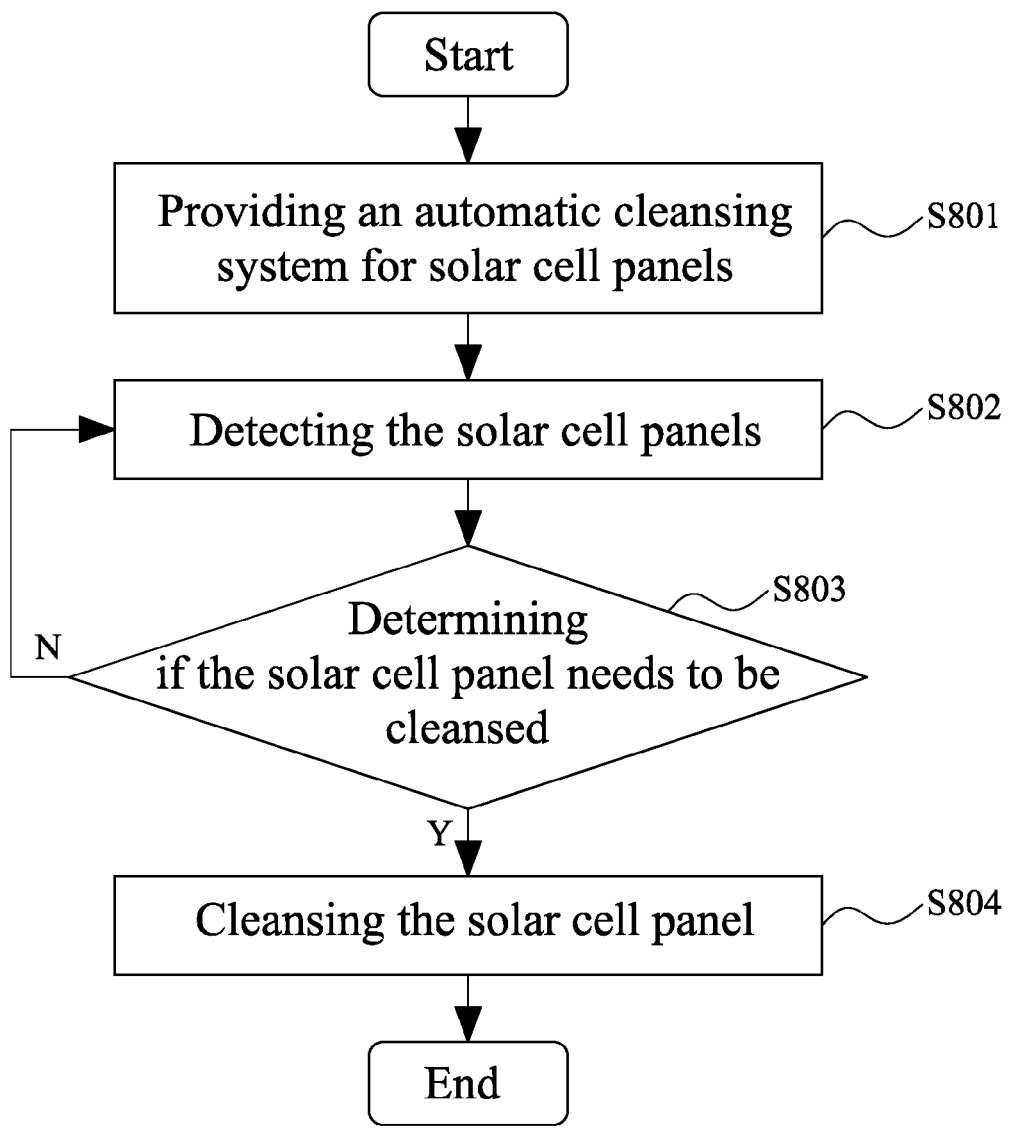
FIG. 4 is a flowchart of a first embodiment of an automatic cleaning method for solar panels.

FIG. 4 is a flowchart of a first embodiment of an automatic cleaning method for solar panels, comprising step S801, providing an automatic cleaning system 1 for solar panels, and step S802, wherein the environmental light sensor 62 obtains an intensity of direct sunlight and transmission light sensor 64 obtains an intensity of sunlight passed through the protection panel 16 of the solar panel 14. In step S803, it is determined whether the protection panel 16 is to be cleaned, wherein the comparison and analysis module 66 of the detection device 6 obtains an acquired difference value Y2 between the environmental sunlight intensity and the transmitted sunlight intensity, compares the difference Y2 with a predetermined standard difference value Y1, and if the acquired difference Y2 exceeds the standard difference Y1, indicating that dirt and dust on the protection panel 16 exceed a predetermined tolerance, the detection device 6 issues an execution signal to the perfusion device 8 and the driving device 10 to clean the solar panel 14. If the acquired difference value Y2 is less than the standard difference value Y1, indicating that the protection panel 16 does not exceed the tolerance, step S802 is repeated.

In Step S804, the driving device 10 drives cleaning device 12 to clean the protection panel 16. The perfusion device 8 sprays cleaning water, cleaning agent, or other medium onto the solar panel 14.

Figure 5:
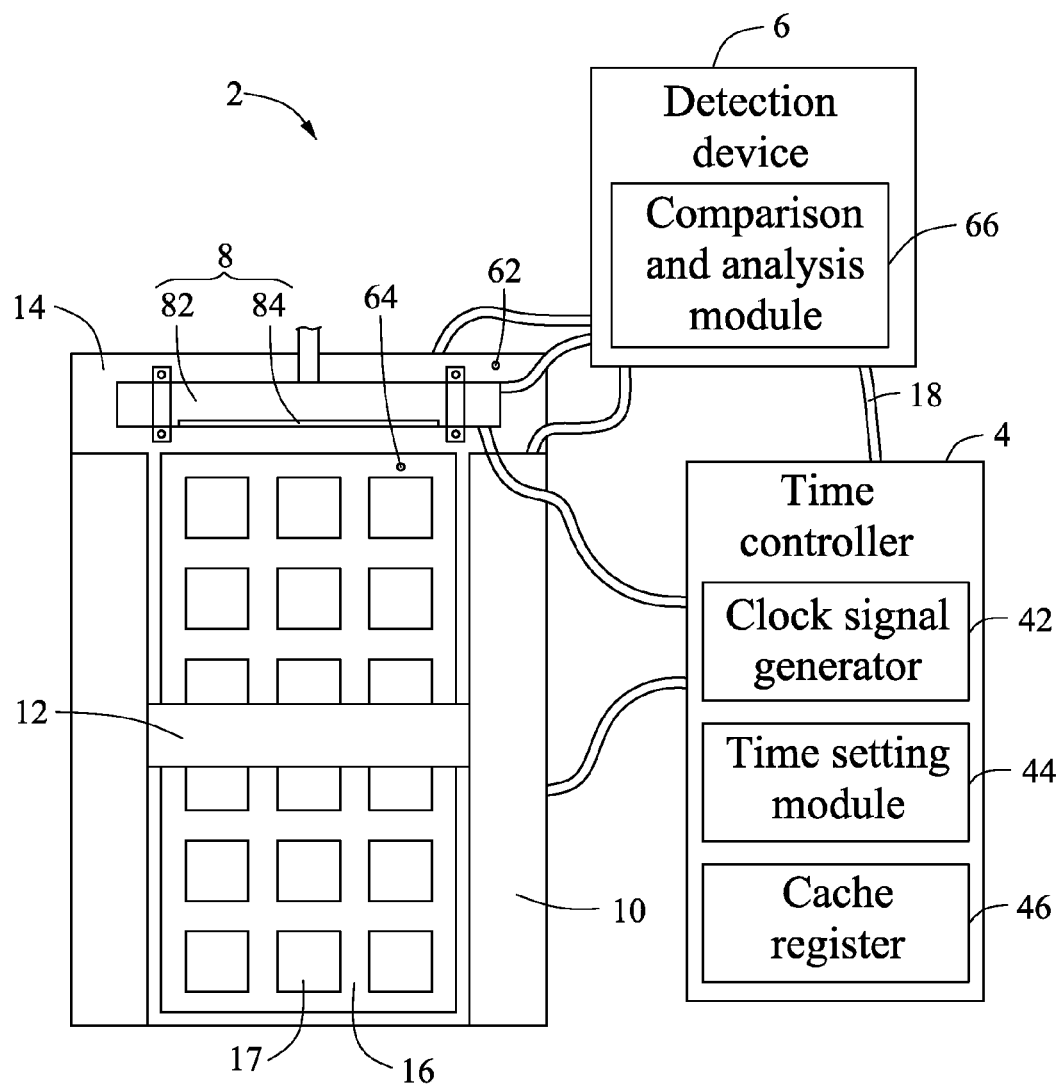
FIG. 5 is a schematic view of a third embodiment of an automatic cleaning system for solar panels.

FIG. 5 shows a third embodiment of an automatic cleaning system for solar panels, differing from the previous embodiment only in the further incorporation of a time controller 4.

The time controller 4 is electrically connected to the detection device 6, the perfusion device 8 and the driving device 10 through a cable 18, and sets time values for execution of the detection device 6 and/or the perfusion device 8 and the driving device 10.

The time controller 4 comprises a clock signal generator 42, a time setting module 44, and a cache register 46. The clock signal generator 42 is a crystal oscillation circuit providing precise time pulses for the system.

The time setting module 44 integrates the working time of all devices of the system. An initial time is set for the system according to the local time, and regular detection time point TC, cleaning time point TW, and cleaning duration TL for each cleaning time are set. The time setting module 44 receives time pulses frequently from the clock generator 42, and provides an execution signal to the detection device 6 when a pulse representing a detection time point TC is received, and the protection panel 16 is checked accordingly. After receiving a pulse representing the cleaning time point TW, the time setting module 44 issues an execution signal to the driving device 10 and the perfusion device 8 to clean the protection panel 16.

When the driving device 10 and the perfusion device 8 begin to clean the panel, a timer signal is sent to the time setting module 44, which in turn begins timing the cleaning. After the predetermined cleaning duration TL passes, the time setting module 44 issues a stop signal to the driving device 10 and the perfusion device 8 to stop the cleaning.

The cache register 46 stores and caches the information set by the time setting module 44.

Figure 6:
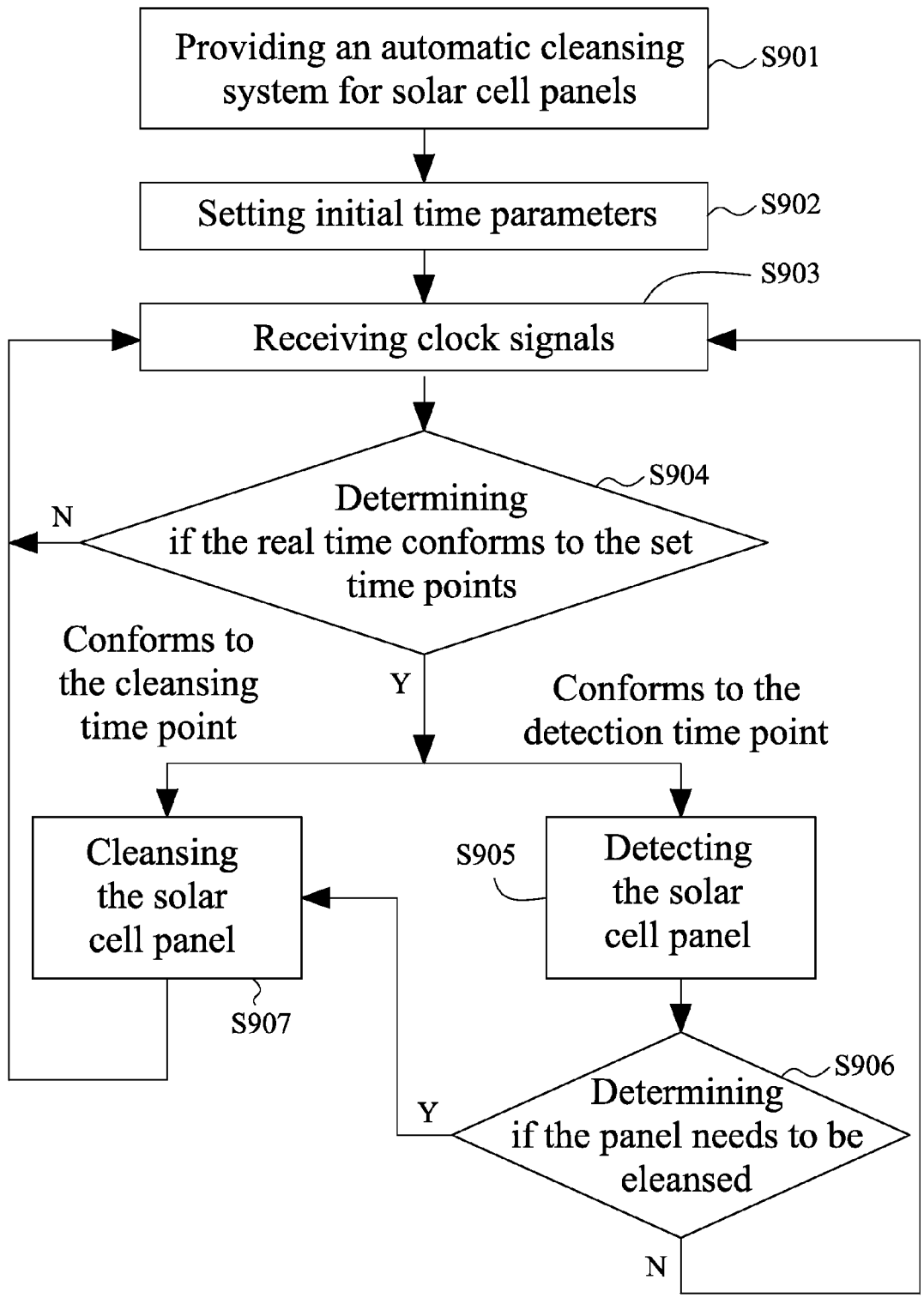
FIG. 6 is a flowchart of a second embodiment of an automatic cleaning method for solar panels.

FIG. 6 is a flowchart of a second embodiment of an automatic cleaning method for solar panels, comprising step S901, providing an automatic cleaning system 2 for a solar panel, and step S902, wherein an initial time is set for the time controller 4 according to the local time, and a regular detection time point TC, a cleaning time point TW and a cleaning duration TL are further set for each cleaning. In step S903, clock signals are received through the time controller 4 comprising a clock generator 42 generating regular clock signals to a time setting module 44. In step S904, the time setting module 44 determines whether the current time conforms to the regular detection time point TC or the cleaning time point TW, and if the current time conforms to the regular detection time point TC, the time setting module 44 issues an execution signal to the detection device 6, and if the current time conforms to the cleaning time point TW, the time setting module 44 issues an execution signal to the driving device 10 and the perfusion device 8. In step S905, the detection device 6, comprising an environmental light sensor 62, a transmission light sensor 64, and a comparison and analysis module 66 checks the solar panel 14, implementing the environmental light sensor 62 and the received light sensor 64. In step S906 the comparison and analysis module 66 in the detection device 6 obtains an intensity difference Y2 by comparing the intensity value detected by the environmental light sensor 62 with the intensity value detected by the transmission light sensor 64, and compares the intensity difference Y2 with a predetermined standard intensity value Y1. If the acquired difference Y2 exceeds the standard difference Y1, indicating that dirt and dust on the protection panel 16 exceed a predetermined tolerance, the detection device 6 issues an execution signal to the perfusion device 8 and the driving device 10 to clean the solar panel 14. If the acquired difference Y2 is less than the standard difference Y1, indicating that the protection panel 16 does not exceed the tolerance, step S902 is repeated. In step S907, after receiving the execution signal from the time setting module 44 or the detection device 6; the perfusion device 8 sprays cleaning water, cleaning agent or other medium onto the solar panel 14 to co-operate with the cleaning device 12 to do cleaning. The driving device 10 and the perfusion device 8 send a timer signal to the time setting module 44, and the time setting module 44 issues a stop signal to the driving device 10 and the perfusion device 8 after a predetermined cleaning duration TL passes.

The disclosed automatic cleaning system and method for solar panels provides prompt detection and effective cleaning for solar panels, and avoid dangerous and inconvenient practices.

The foregoing description of the exemplary embodiments of the disclosure has been presented only for the purposes of illustration and description, and is not intended to be exhaustive or to limit the disclosure to the precise forms disclosed. Many modifications and variations are possible in light of the above teaching. The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which this disclosure pertains without departing from its spirit and scope. Accordingly, the scope of this disclosure is defined by the appended claims rather than the foregoing description and the exemplary embodiments described therein.

What is claimed is:

1. An automatic cleaning system for solar panels covered by a protection panel, comprising:
    a cleaning device provided on the protection panel;
    a driving device capable of driving the cleaning device to move and comprising:
        a pair of slides arranged at two sides of the protection panel;
        two pulleys arranged on the respective slides and connected to the cleaning device to allow the cleaning device to move along the slides;
        a driving motor driving the pulleys to drive the cleaning device to move along the slides;
        a pair of secondary commutation sensors on two ends of each of the slides; and
        a primary commutation sensor mounted on the cleaning device, and configured to signal the driving motor to change the moving direction of the cleaning device when the cleaning device moves to the respective end of each of the slides and the primary commutation sensor aligns with the respective secondary commutation sensor; and
    a detection device connected with the cleaning device and the driving device, and capable of determining whether the solar panels need to be cleaned;
    a time controller electrically connected to the detection device, the time controller setting a regular detection time point and signaling the detection device to detect whether the solar panels needs to be cleaned if current time conforms to the regular detection time point.

2. The automatic cleaning system for solar panels as claimed in claim 1, wherein the detection device compares difference between environmental intensity of sunlight and intensity of sunlight on the solar panel with a predetermined standard difference to determine if the solar panels need to be cleaned, and upon the condition that difference between environmental intensity of sunlight and intensity of sunlight on the solar panels exceeds the predetermined standard difference, the detection device instructs the driving device to drive the cleaning device to clean the solar panels according to the detection result.

3. The automatic cleaning system for solar panels as claimed in claim 1, wherein the cleaning device comprises:
    a perfusion device located at one end of the protection panel and capable of spraying water and cleaning agent to clean the protection panel;
    a washer located opposite the protection panel to brush the protection panel; and
    a holding part arranged over the washer to hold the washer, wherein the holding part is driven by the driving device.

4. The automatic cleaning system for solar panels as claimed in claim 3, wherein the perfusion device comprises a conduit comprising an outlet tank.

5. The automatic cleaning system for solar panels as claimed in claim 4, wherein the time controller is electrically connected to the perfusion device and the driving device, and the time controller sets time values for controlling the perfusion device, and the driving device for detection and cleaning.

6. The automatic cleaning system for solar panels as claimed in claim 3, wherein the washer is a rolling brush with a rolling axle, and the rolling axle is driven by a motor provided within the holding part.

7. The automatic cleaning system for solar panels as claimed in claim 3, wherein the washer is impelled by a flexible member provided within the holding part to contact the solar panels.

8. The automatic cleaning system for solar panels as claimed in claim 3, wherein the holding part is located between the pulleys on the two sides and moved by the rotation of the pulleys.

9. An automatic cleaning system for solar panels covered by a protection panel, comprising:
    a cleaning device provided on the protection panel and comprising a perfusion device capable of spraying water and a cleaning agent;
    a driving device capable of driving the cleaning device and comprising:
        a pair of slides arranged at two sides of the protection panel;
        two pulleys arranged on the respective slides and connected to the cleaning device to allow the cleaning device to move along the slides;
        a driving motor driving the pulleys to drive the cleaning device to move along the slides;
        a pair of secondary commutation sensors on two ends of each of the slides; and
        a primary commutation sensor mounted on the cleaning device, and configured to signal the driving motor to change the moving direction of the cleaning device when the cleaning device moves to the respective end of each of the slides and the primary commutation sensor aligns with the respective secondary commutation sensor;
    a detection device connected with the cleaning device and the driving device and capable of determining whether the solar panels need to be cleaned; and
    a time controller electrically connected to the detection device, the perfusion device, and the driving device, the time controller setting time values for controlling the detection device, the perfusion device, and the driving device for detection and cleaning, wherein the time controller comprises:
        a clock signal generator capable of providing clock signals to the cleaning device and the detection device;

a time setting module capable of integrating the working time of all devices of the system based on predetermined time values; and a cache register for storing and caching the information set by the time setting module;

wherein the time controller electrically connected to the detection device, the time controller setting a regular detection time point and signaling the detection device to detect whether the solar panels needs to be cleaned if current time conforms to the regular detection time point.

10. An automatic cleaning system for solar panels covered by a protection panel, comprising:

a cleaning device provided on the protection panel;

a driving device capable of driving the cleaning device and comprising:

a pair of slides arranged at two sides of the protection panel;

two pulleys arranged on the respective slides and connected to the cleaning device to allow the cleaning device to move along the slides;

a driving motor driving the pulleys to drive the cleaning device to move along the slides;

a pair of secondary commutation sensors on two ends of each of the slides; and a primary commutation sensor mounted on the cleaning device, and configured to signal the driving motor to change the moving direction of the cleaning device when the cleaning device moves to the respective end of each of the slides and the primary commutation sensor aligns with the respective secondary commutation sensor; and a detection device connected with the cleaning device and the driving device and capable of determining whether the solar panels need to be cleaned, wherein the detection device comprises:

an environmental light sensor externally connected to the protection panel of the solar panels, for measuring direct environmental sunlight intensity thereon;

a received light sensor provided under the protection panel of the solar panels, and detecting transmitted sunlight intensity passed through the protection panel; and a comparison and analysis module comparing the sunlight intensity detected by the environmental light sensor with the sunlight intensity detected by the received light sensor, obtaining a difference between the environmental sunlight intensity and the transmitted sunlight intensity, and comparing the difference with a predetermined standard difference, and upon the condition that the difference between environmental sunlight intensity and transmitted sunlight intensity on the solar panels exceeds the predetermined standard difference, the detection device instructs the driving device to drive the cleaning device to clean the solar panels according to the detection result;

a time controller electrically connected to the detection device, the time controller setting a regular detection time point and signaling the detection device to detect whether the solar panels needs to be cleaned if current time conforms to the regular detection time point.

* * * * *

UNITED STATES PATENT AND TRADEMARK OFFICE
CERTIFICATE OF CORRECTION

PATENT NO. : 8,323,421 B2  
APPLICATION NO. : 12/333624  
DATED : December 4, 2012  
INVENTOR(S) : Han-Lung Lee Page 1 of 1

It is certified that error appears in the above-identified patent and that said Letters Patent is hereby corrected as shown below:

Title Page, below Item (22) insert:

-- (30)    Foreign Application Priority Data

Apr. 24, 2008    (CN) ..........................200810301283.8 --

Signed and Sealed this  
Twenty-second Day of October, 2013

Teresa Stanek Rea  
*Deputy Director of the United States Patent and Trademark Office*